US008665270B2

(12) United States Patent
Buscema

(10) Patent No.: US 8,665,270 B2
(45) Date of Patent: Mar. 4, 2014

(54) METHOD OF DETERMINING IMPLICIT HIDDEN FEATURES OF PHENOMENA WHICH CAN BE REPRESENTED BY A POINT DISTRIBUTION IN A SPACE

(75) Inventor: Paolo Massimo Buscema, Rome (IT)

(73) Assignees: CSI Ricerca & Ambiente SRL, Rome (IT); Semeion Centro Ricerche, Rome (IT)

( * ) Notice: Subject to any disclaimer, the term of this patent is extended or adjusted under 35 U.S.C. 154(b) by 511 days.

(21) Appl. No.: 12/969,673

(22) Filed: Dec. 16, 2010

(65) Prior Publication Data

US 2012/0154398 A1   Jun. 21, 2012

(51) Int. Cl.
*G06T 15/40*   (2011.01)
(52) U.S. Cl.
USPC .......................................... 345/421; 345/424
(58) Field of Classification Search
USPC .................................. 345/421, 424
See application file for complete search history.

(56) References Cited

PUBLICATIONS

Bommer et al. "On the Use of Logic Trees for Ground-Motion Prediction Equations in Seismic-Hazard Analysis"; Bulletin of the Seismological Society of America, vol. 95, No. 2, pp. 377-389, Apr. 2005.*

Danese et al. "Kernel Density Estimation Methods for a Geostatistical Approach in Seismic Risk Analysis: The Case Study of Potenza Hilltop Town (Southern Italy)"; O. Gervasi et al. (Eds.): ICCSA 2008, Part I, LNCS 5072, pp. 415-429, 2008. © Springer-Verlag Berlin Heidelberg 2008.*
Ouyang et al. "Data Mining for Seismic Exploration"; 2008 IEEE/WIC/ACM International Conference on Web Intelligence and Intelligent Agent Technology.*
Song et al. "Optimized Autonomous Space In-situ Sensor-Web for Volcano Monitoring"; 11-4244-1488-1/08/$25.00 C 2008 IEEE IEEE AC paper #1144, Version 2, Updated Oct. 24, 2007.*

* cited by examiner

*Primary Examiner* — Maurice L McDowell, Jr.
(74) *Attorney, Agent, or Firm* — Themis Law

(57) ABSTRACT

A method of determining implicit hidden features of phenomena, representable by a point distribution in a space, includes the following steps: defining a set of first parameters describing effects of a phenomenon such as an event or process; defining a n-dimensional space, wherein the first parameters are represented by entity points; determining, as a function of measured values of the first parameters, additional geometrical points in the n-dimensional space, which are expected to provide additional characteristic parameters describing the phenomenon or additional locations where the phenomenon will produce its effects; adding the additional parameters or points, in recurrent sequence, to the first parameters or points, to define at each iterative step a shorter minimum spanning tree than at the preceding step; and displaying or printing the n-dimensional space, wherein the additional characteristic parameters or points are shown together with the first parameters and the geometrical point.

6 Claims, 5 Drawing Sheets

One of the possible MST of the original 5x5 Grid

The Recurrent MST of the 5x5 Grid

| ID# | Name | X | Y | ID# | Name | X | Y |
|---|---|---|---|---|---|---|---|
| 1 | 3597-Greeley-07/22/2003 | 40.43618 | -104.680862 | 47 | 3643-Longmont-04/28/2004 | 40.168116 | -104.975564 |
| 2 | 3598-Erie-07/22/2003 | 40.04151 | -105.070339 | 48 | 3644-Longmont-04/28/2004 | 40.168116 | -104.975564 |
| 3 | 3599-Windsor-07/16/2003 | 40.474553 | -104.906879 | 49 | 3645-Longmont-04/28/2004 | 40.168116 | -104.975564 |
| 4 | 3600-Greeley-07/22/2003 | 40.420067 | -104.702369 | 50 | 3646-Longmont-04/28/2004 | 40.168116 | -104.975564 |
| 5 | 3601-Ault-07/24/2003 | 40.582409 | -104.732307 | 51 | 3647-Greeley-05/14/2004 | 40.409964 | -104.708009 |
| 6 | 3602-Dacono-07/23/2003 | 40.082286 | -104.926274 | 52 | 3648-Windsor-05/15/2004 | 40.460193 | -104.899636 |
| 7 | 3603-Erie-07/24/2003 | 40.011271 | -104.992257 | 53 | 3649-Fort_Lupton-06/01/2004 | 40.089076 | -104.813936 |
| 8 | 3604-Windsor-07/25/2003 | 40.472649 | -104.887398 | 54 | 3650-Fort_Lupton-06/01/2004 | 40.089076 | -104.813936 |
| 9 | 3605-Erie-07/25/2003 | 40.0485 | -105.047257 | 55 | 3651-Evans-06/01/2004 | 40.379657 | -104.70303 |
| 10 | 3606-Erie-07/25/2003 | 40.03836 | -105.041328 | 56 | 3652-Brighton-06/03/2004 | 40.011743 | -104.841405 |
| 11 | 3607-Windsor-07/25/2003 | 40.534943 | -104.934814 | 57 | 3653-Longmont-06/06/2004 | 40.183277 | -104.979408 |
| 12 | 3608-Longmont-07/26/2003 | 40.1314 | -104.941949 | 58 | 3654-Longmont-06/06/2004 | 40.183277 | -104.979408 |
| 13 | 3609-Kersey-07/27/2003 | 40.386085 | -104.564364 | 59 | 3655-Longmont-06/06/2004 | 40.183277 | -104.979408 |
| 14 | 3610-Greeley-07/27/2003 | 40.426548 | -104.752992 | 60 | 3656-Longmont-06/06/2004 | 40.183277 | -104.979408 |
| 15 | 3611-Longmont-07/27/2003 | 40.14563 | -104.914649 | 61 | 3657-Longmont-06/14/2004 | 40.161752 | -105.016678 |
| 16 | 3612-Greeley-07/27/2003 | 40.43016 | -104.720259 | 62 | 3658-Longmont-06/13/2004 | 40.161752 | -105.016678 |
| 17 | 3613-Greeley-07/28/2003 | 40.420067 | -104.702369 | 63 | 3659-Longmont-06/13/2004 | 40.161752 | -105.016678 |
| 18 | 3614-Firestone-07/28/2003 | 40.116852 | -104.938301 | 64 | 3660-Evans-06/16/2004 | 40.377353 | -104.712901 |
| 19 | 3615-Fort_Lupton-07/29/2003 | 40.090212 | -104.801898 | 65 | 3661-Greeley-06/16/2004 | 40.411412 | -104.772446 |
| 20 | 3616-Fort_Lupton-07/30/2003 | 40.080136 | -104.895584 | 66 | 3662-Windsor-06/13/2004 | 40.542424 | -104.923573 |
| 21 | 3617-Keenesburg-07/29/2003 | 40.107445 | -104.519854 | 67 | 3663-Eaton-06/20/2004 | 40.53028 | -104.713189 |
| 22 | 3618-Greeley-07/28/2003 | 40.439156 | -104.795461 | 68 | 3664-Fort_Lupton-06/20/2004 | 40.149673 | -104.848703 |
| 23 | 3619-Longmont-07/30/2003 | 40.189222 | -105.02433 | 69 | 3665-Frederick-06/29/2004 | 40.102954 | -104.935093 |
| 24 | 3620-Erie-07/30/2003 | 40.017179 | -105.096407 | 70 | 3666-Windsor-06/30/2004 | 40.461847 | -104.899322 |
| 25 | 3621-Longmont-07/30/2003 | 40.189456 | -105.028018 | 71 | 3667-Windsor-07/01/2004 | 40.460497 | -104.896534 |
| 26 | 3622-La_Salle-07/31/2003 | 40.273135 | -104.696469 | 72 | 3668-Greeley-07/02/2004 | 40.388221 | -104.783103 |
| 27 | 3623-Longmont-07/31/2003 | 40.163394 | -105.100504 | 73 | 3669-Dacono-07/05/2004 | 40.083378 | -104.930278 |
| 28 | 3624-Greeley-07/30/2003 | 40.360613 | -104.750685 | 74 | 3670-Dacono-07/05/2004 | 40.083378 | -104.930278 |
| 29 | 3625-Greeley-07/31/2003 | 40.42107 | -104.698525 | 75 | 3671-Dacono-07/05/2004 | 40.083378 | -104.930278 |
| 30 | 3626-Keenesburg-08/04/2003 | 40.093638 | -104.58453 | 76 | 3672-Greeley-07/04/2004 | 40.390296 | -104.772431 |
| 31 | 3627-Windsor-08/01/2003 | 40.474553 | -104.906879 | 77 | 3673-Eaton-07/07/2004 | 40.525609 | -104.722431 |
| 32 | 3628-Windsor-08/03/2003 | 40.460662 | -104.892109 | 78 | 3674-Greeley-07/08/2004 | 40.418217 | -104.740956 |
| 33 | 3629-Frederick-08/05/2003 | 40.106834 | -104.928865 | 79 | 3675-Fort_Lupton-07/10/2004 | 40.091524 | -104.807118 |
| 34 | 3630-Longmont-08/07/2003 | 40.142327 | -104.921588 | 80 | 3676-Fort_Lupton-07/10/2004 | 40.091524 | -104.807118 |
| 35 | 3631-Frederick-08/09/2003 | 40.101909 | -104.932565 | 81 | 3677-Greeley-07/14/2004 | 40.421173 | -104.734275 |
| 36 | 3632-Erie-08/11/2003 | 40.038381 | -105.041502 | 82 | 3678-Greeley-07/14/2004 | 40.421173 | -104.734275 |
| 37 | 3633-Dacono-08/12/2003 | 40.07949 | -104.942336 | 83 | 3679-Windsor-07/14/2004 | 40.468719 | -104.908737 |
| 38 | 3634-Greeley-08/13/2003 | 40.417232 | -104.687709 | 84 | 3680-Greeley-07/17/2004 | 40.431738 | -104.746633 |
| 39 | 3635-Johnstown-08/13/2003 | 40.342256 | -104.918406 | 85 | 3681-Brighton-07/16/2004 | 40.004304 | -104.719294 |
| 40 | 3636-Windsor-08/19/2003 | 40.472649 | -104.887398 | 86 | 3682-Hudson-07/27/2004 | 40.089706 | -104.612994 |
| 41 | 3637-Mead-08/20/2003 | 40.24117 | -104.994219 | 87 | 3683-Erie-07/31/2004 | 40.072639 | -105.032413 |
| 42 | 3638-Johnstown-08/21/2003 | 40.331282 | -104.913068 | 88 | 3684-Hudson-08/06/2004 | 40.068827 | -104.640689 |
| 43 | 3639-Erie-08/21/2003 | 40.065191 | -105.059814 | 89 | 3685-Ault-08/07/2004 | 40.58691 | -104.73699 |
| 44 | 3640-Greeley-08/19/2003 | 40.400764 | -104.753229 | 90 | 3686-Fort_Lupton-08/20/2004 | 40.084304 | -104.813114 |
| 45 | 3641-Erie-09/03/2003 | 40.032984 | -105.078538 | 91 | 3687-Windsor-08/27/2004 | 40.519746 | -104.867032 |
| 46 | 3642-Firestone-03/19/2004 | 40.114109 | -104.941978 | 92 | 3688-Evans-09/02/2004 | 40.37409 | -104.683459 |

FIG. 2

MST Recurrent Algorithm : Points of Missed Events or New Events
(Buscema 2009 – Semeion)

| Number | Energy | X | Y |
|---|---|---|---|
| Min MST_1 | -11.151855 | 40.039261 | -104.806694 |
| Min MST_2 | -5.72998 | 40.198895 | -104.999466 |
| Min MST_3 | -4.895508 | 40.483208 | -104.86824 |
| Min MST_4 | -4.693359 | 40.400475 | -104.766045 |
| Min MST_5 | -4.05249 | 40.060234 | -105.048241 |
| Min MST_6 | -2.229004 | 40.026443 | -104.995987 |
| Min MST_7 | -2.050781 | 40.360859 | -104.670822 |
| Min MST_8 | -1.438477 | 40.427277 | -104.748627 |
| Min MST_9 | -1.06958 | 40.186077 | -105.018051 |

FIG. 4

```
NewPoints=0;
do
{
    for(i=0;i<NumPoints+NewPoints-1;i++)
    {
        for(j=i+1;j<NumPoints+iNewPoints;j++)
        {
            D[i][j]=Euclidean_Distance ((x[i],x[j],y[i],y[j]);
            D[j][i]=D[i][j];
        }
    }
    if(NewPoints==0)    OldMinMST=MST(D,NumPoints);
    NewMinMST=OldMinMST;
    for(i=MinY;i<MaxY;i++)
    for(j=MinX;j<MaxX;j++)
    {
        for(k=0;k<NumPoints+NewPoints;k++)
        {
            D[NumPoints+NewPoints][k]=Euclidean_Distance ((x[i],x[j],y[i],y[j]);
            D[k][NumPoints+NewPoints]=D[NumPoints+NewPoints][k];
        }
        Sum=MST(D,NumPoints+NewPoints);
        if(Sum<NewMinMST) {NewMinMST=Sum;mstY[NewPoints]=i;mstX[newPoints]=j;}
    }
    if (OldMinMST>NewMinMST) { NewPoint ++; OldMinMST=NewMinMST;contnue=1;};
} while (continue);
```

FIG. 5

METHOD OF DETERMINING IMPLICIT HIDDEN FEATURES OF PHENOMENA WHICH CAN BE REPRESENTED BY A POINT DISTRIBUTION IN A SPACE

FIELD OF THE INVENTION

The invention relates to a method of determining implicit hidden features of phenomena which can be represented by a point distribution in a space.

Particularly the invention relates to a method of determining hidden features of phenomena which take place in a space, and the effect of said phenomena as described by values of parameters which can be measured and which can be represented by points on a map, particularly a two or three dimensional map.

According to a further application of the invention, the method may be employed to determine hidden features of phenomena which are geo-referentiated, i.e. which take place in a geophysical territory, the territory being described by a two or three dimensional geometrical map.

The present invention is particularly relevant for evaluating complex phenomena, which can include physical processes or events.

BACKGROUND OF THE INVENTION

Events or processes are observed and described by effects, which can be described by measuring the values of certain physical or chemical parameters at a certain time and at certain locations in space. Generally, the data acquired from these measurements are useful for determining the current condition of the event or process or generally speaking of the phenomena. When complex phenomena are considered it may not be at once clear if all the possible effects have been considered or if further effects derive or are related to the phenomena under study. Furthermore, if the phenomena are distributed over a certain area, than it is possible that not every location has been considered or is known or appears to be relevant for measuring the parameters describing the consequences of a phenomenon.

The possible additional parameters and/or the locations at which the effects of the phenomenon will arise may in general not be determined directly by analysing the phenomenon due to the high degree of complexity and no-linearity of the laws governing the phenomenon.

Giving an answer to the above problem is relevant for generating a machine, which can analyze and describe phenomena in an automatic and objective way without the need of entering the in the highly complex and non linear mechanism ruling the phenomena, and also for enhancing the cognitive capacities of devices having a certain level or type of artificial intelligence. Indeed the most challenging technical problem of artificial intelligence is providing means, which enable a device having artificial intelligence to evaluate measured data for determining the most probable consequences and thus taking decisions on how to react to the measured data. This problem is simple until the relationship between the measured data and the space/time evolution of an event or process can be expressed with exact equations. Human intelligence, however, is provided with a skill which allows extracting probable consequences from data that are apparently not clearly related one to the other. The way of determining these consequences is highly non linear and non deterministic, such that it is not a straight manner of implementing or trying to simulate such skills in a device, even if at a very primitive level.

Furthermore, when phenomena are very complex and involve a large number of variables, then even the human skill of giving a heuristic answer to the problem of describing the phenomenon is not sufficient.

Many events or processes can be described by a map, in which characteristic data are represented by points on the map. Such data relates to the measured values of physical and or chemical parameters univocally describing the status at a certain time at which said measure has been carried out.

Currently, there exists a method of determining the relationships between said points, which is known with the denomination of Minimum Spanning Tree. According to this method, for every distribution of points in a D-dimensional space it is possible to determine at least one minimum spanning tree. The minimum spanning tree is the smallest sum of the distances of the points according to certain connections between each point and another point of the map.

A more rigorous mathematical definition is the following:

Given a connected, undirected graph, a spanning tree of that graph is a sub graph which is a tree and connects all the vertices together. A single graph can have many different spanning trees. It is possible to assign a weight to each edge, which is a number representing how unfavorable it is, and use these weights to assign a weight to a spanning tree by computing the sum of the weights of the edges in that spanning tree. A minimum spanning tree (MST) or minimum weight spanning tree is then a spanning tree with a weight less than or equal to the weight of every other spanning tree.

The MST and several algorithms are well known in the art and are common general knowledge of the skilled person.

SUMMARY OF THE INVENTION

The object of the present invention is to provide a method for determining implicit hidden features of phenomena, which can be represented by a point distribution in a space in an automatic and simple way and to represent said hidden features graphically.

Surprisingly, it has been found that starting from a certain distribution of measured parameters which describes the phenomenon and which are represented in a map in an n-dimensional space, particularly in two or three dimensional space, it is possible to extract from the distribution of said points information on other points having different positions on said map and to represent additional parameters or additional locations which have a relevance for the phenomenon or at which the effects of the phenomenon has or will appear.

It seems that the distribution of the measured points implicitly includes the presence of the hidden points.

The method according to the present invention comprises the following steps:

defining a set of first parameters describing the effects of the phenomenon such as an event or process, the first parameters being measurable and being characteristic of said event or process;

defining a n-dimensional space, in which said first parameters describing the event or process are represented by points defined as entity points;

determining as a function of the measured values of said first characteristic parameters describing the event or process additional geometrical points in said n-dimensional space, the geometrical points being expected to be additional characteristic parameters describing the phenomenon or additional locations at which the phenomenon will produce its effects;

adding the additional parameters or points, in a recurrent sequence, to the first parameters or points, so to have at each iterative step a shorter minimum spanning tree than at the step before;

displaying or printing said n-dimensional space, in which said additional characteristic parameters or points are shown together with the first parameters as well as the geometrical point.

The method steps are easily understood since, at each step, one point or parameter is added to the first ones, which reduces the length of the minimum spanning tree. At each following step the points or parameters determined in the preceding steps are maintained and a new point or parameter is searched that further reduces the length of the minimum spanning tree.

As already indicated, the new set of points are somehow implicit points of the original map of the points corresponding to the first parameters, and the method according to the invention defines the set of these implicit points/parameters of any map in a D-dimensional space.

Since considering said d-dimensional space a continuum would lead to infinite minimum spanning trees, in order to have a finite number of steps, the space is quantized in pixels or voxels, and a certain minimum pixel or voxel distance is defined.

A preferred pixel or voxel distance is about 0.5 mm.

The method according to the present invention determines the coordinates of the additional points and the presence of additional parameters of a phenomenon in a quantized space as defined above according to the following algorithm:

The Minimum Spanning Tree problem is defined as follows: find an acyclic subset T of E that connects all of the vertices V in the graph and whose total weight is minimized, where the total weight is given by $$d(T) = \sum_{i=1}^{N-1} \sum_{j=i+1}^{N} d_{i,j}, \forall d_{i,j}$$

T is defined as spanning tree, and MST is the T with the minimum sum of its weighed edges.

$$Mst = \text{Min}\{d(T)\}$$

The number of its possible tree is:

$$T = V^{V-2}$$

Here $d_{i,j}$ is the Euclidean distance of each point i from each point j;

d(T) is the length of sum of the edges.

V are the vertices, i.e. the points on the map.

The above step is repeated to determine in sequence a new point or parameter, which when added to the other points or parameters allows obtaining a smaller minimum spanning tree.

An array of generic points in the d-dimensional space is defined. In this array the points are equally spaced one from the other along each of the d-dimensions, and at each step the minimum spanning tree is calculated for a distribution of points comprising the first points and one of the points of said array of generic points. The generic point of the array for which the smallest minimum spanning tree results is then taken as the additional unknown implicit point or parameter and is added to the set of the first points. This amended set of first points is then used for repeating the above steps. These steps are repeated cyclically until no further generic point of the remaining points in the array is found, for which a smaller MST can be computed as the one computed in the last step.

At every step the additional point determined in the previous step is maintained and the new MST is determined using all the first points and the each one of the additional points added in each one of the preceding steps of the sequence of steps.

The added additional points/parameters are then displayed in a graphical representation together with other first points or parameters, or the values representing the coordinate of these additional points are saved and/or printed.

A graphical representation may be the best way of presenting the additional points or parameters when the space is two or three dimensional.

BRIEF DESCRIPTION OF THE DRAWINGS

Some examples of the method according to the invention will be described in the following description with the help of the enclosed figures in which:

FIG. 2 is the table of cases related to the propagation of the west Nile Virus in Weld County.

FIG. 4 illustrates a table, in which the nine iterative steps are listed and for each step the total energy of the system and the coordinate of the new found point, minimizing the spanning tree when added to the initial point distribution on the map.

FIG. 5 is a table representing the algorithm expressed in a programming language.

DETAILED DESCRIPTION OF EMBODIMENTS OF THE INVENTION

Figure 1:
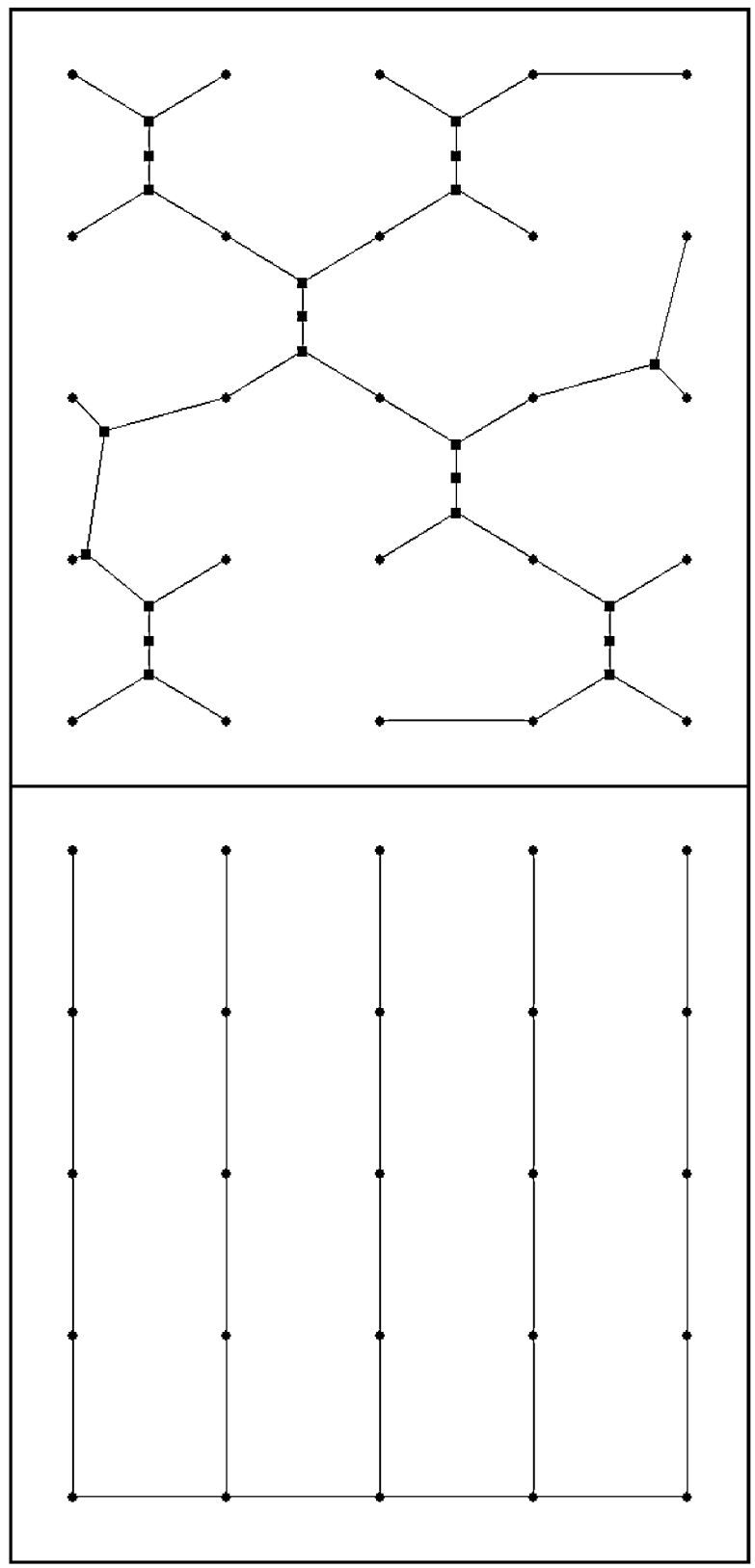
FIG. 1 illustrates on the left side the graphical representation of the minimum spanning tree obtained by means of the known method of a 5×5 array of points or grid. On the right side of the figure there is shown the minimum spanning tree obtained for the same 5×5 distribution of points. The minimum spanning tree is calculated according to the present invention by adding to the initial 5×5 grid the new points.

The example of FIG. 1 relates to comparing the determination of the MST of a grid of points having a 5×5 dimension according to known methods and according to the method of the present invention.

On the left side of FIG. 1, the 5×5 array of points coinciding with the crossing points of the lines of the grid are shown in a two dimensional space. The minimum spanning tree determined by the current known algorithm is formed by horizontal lines each connecting a line of points of the grid, and a vertical line connecting the points of the first column of the grid.

The map on the right side illustrates the MST determined recurrently according to the present invention. In the map showing the grid or array of said initial points, additional points have been added, which are displayed in the map. These additional points lead to a different configuration of the MST, which is smaller than the one on the map of the left side of FIG. 2 and which is calculated according to a known algorithm.

The points represented by the small squares are the points added according to the present method.

At each step a point is added and a new minimum spanning tree is determined, which is smaller than the one of the previous distribution of points.

In order to carry out this task, the space defined by the map is quantized by means of an array of points. In the present example the array of points is two dimensional, so that the space of the map can be described as an array of pixels having a certain distance one from another along the two directions.

At a first step, the method computes the minimum spanning tree for each distribution of points including one of the points of said array of points, in which the space is quantized. The smallest minimum spanning tree is determined and the added point for which this smallest minimum spanning tree has been computed is added to the map.

In the following step, the same process is repeated but this time the initial distribution of points for the step comprises the original initial distribution of points and the one calculated in the first step.

This mechanism is repeated for each step, each time defining a new distribution of points comprising the original one and each of the points added in the previous steps. The iteration is stopped when the step does not lead to a MST that is smaller than the one determined in the previous steps.

Figure 3:
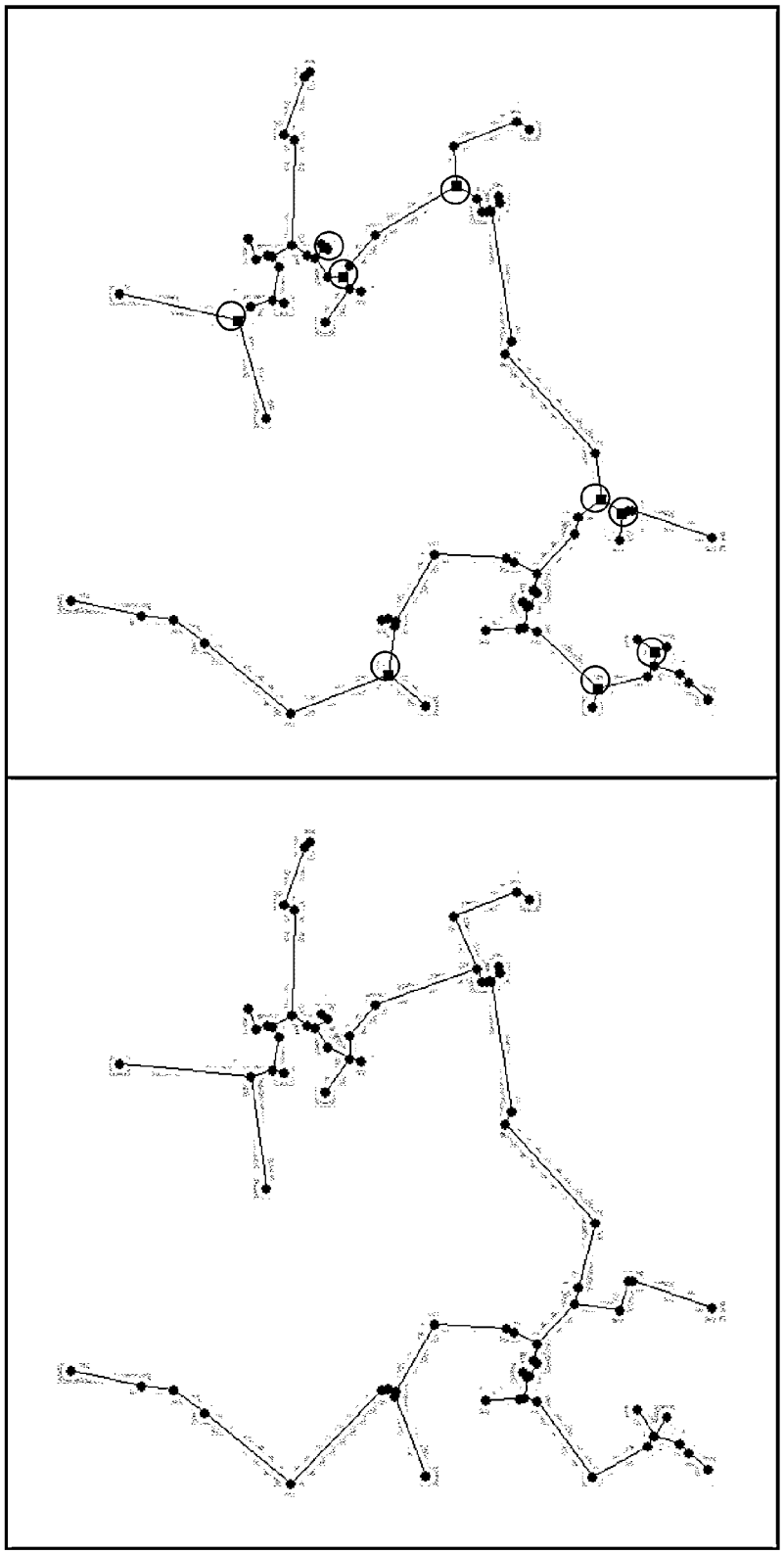
FIG. 3 illustrates on the left side the two dimensional map of entity or assigned points, which has been taken from the table according to FIG. 2 and where the MST has been calculated according to the current algorithm, while on the right side the same map is illustrated but the MST is calculated according to the method of the present invention and the nine new points are represented on the map by encircled squares.

An example that is more practical is illustrated by means of FIGS. 2 to 4 and relates to the propagation of the west Nile Virus in Weld County.

The table of FIG. 2 indicates the order number, the number of birds being found infected, the name of the place and the date and the geographical coordinates of such place where the dead birds had been found.

On the left side of FIG. 3 a map (two dimensional) is illustrated, on which the locations where the infected birds had been found are represented by points placed in the two dimensional space according to their geographic coordinates. The lines connecting the points represent the minimum spanning tree calculated according to known methods.

On the right side of FIG. 3 the minimum spanning tree and the nine new added points are shown, calculated after nine iterations of the method according to the present invention.

The points on the map represent geographical locations in which also dead birds should have been found. The method has revealed said unknown locations by indicating that the phenomenon should have generated effects also at these locations.

Those points are illustrated by encircled small squares. Indeed, investigations have shown that dead birds infected by the virus have been found also at those locations. The points added by means of the present method are points which were not investigated or at which at the time of the findings no case had been found, but at which cases occurred at future times.

FIG. 4 illustrates a table, where the nine steps are listed. In each step one of those points has been found. The coordinates of those points are listed on the same line as the corresponding step.

For each step and point the contribution to the global energy of the system is computed. As it appears clearly, the added energy is always negative.

In FIG. 5 the program steps are reported, which describe the algorithm for carrying out computations according to the equations describing the present method.

As it appears clearly, in the computations for each step of the recurrent MST, the last line describes the verification if an additional step is needed for determining an additional hidden point or if no additional point is needed. If an additional point has to be determined, the steps are repeated by maintaining all the other points determined in the previous steps as points on the map, on which the calculation of the coordinates of the additional point has to be based.

The present application relates also to such an algorithm expressed in a program code which is saved on a hard disk or on a portable readable medium, which may include a non-transitory portable readable medium or a non-transitory computer recordable medium.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

What is claimed is:

1. A method of determining implicit hidden features of phenomena representable by a point distribution in a space, the method comprising:
    defining a set of first parameters describing effects of a phenomenon such as an event or a process, the first parameters being measurable and characteristic of the event or process;
    defining a n-dimensional space wherein the first parameters are represented by entity points;
    determining, as a function of measured values of the first parameters, additional geometrical points in the n-dimensional space, the additional geometrical points being expected to provide additional characteristic parameters which describe the phenomenon or additional locations at which the phenomenon will produce its effects;
    adding the additional characteristic parameters or additional geometrical points, in a recurrent sequence, to the first parameters or entity points so to have at each iterative step a shorter minimum spanning tree (MST) than at a previous step; and
    displaying on a display device the n-dimensional space, wherein the additional characteristic parameters or additional geometrical points are shown together with the first parameters represented as the entity points.

2. The method of claim 1, further comprising:
    (a) defining an array of generic points in the n-dimensional space, the generic points in the array being equally spaced one from another along each of the n-dimensions, the minimum spanning tree at each step being calculated for a distribution of points that comprise the first points and one of the points of the array of generic points;
    (b) taking a generic point of the array, for which the smallest minimum spanning tree results, as the additional unknown implicit point or parameter and adding the generic point to the set of the first points forming an amended set of first points;
    (c) using the amended set of first points to repeat the above steps; and
    (d) repeating steps (a)-(c) cyclically until no additional generic point of the remaining points in the array is found for which a smaller MST is computable than the one computed in the last step.

3. The method of claim 2, wherein at every step the additional unknown implicit point or parameter determined in the previous step is maintained and the new MST is determined using all the first points, each of the additional unknown implicit points being added in each of the preceding steps of the sequence of steps.

4. The method of claim 1, wherein at each step the MST is determined according to the following algorithm:

find an acyclic subset T that connects all of the vertices V in the graph and whose total weight is minimized, where the total weight is given by $$d(T) = \sum_{i=1}^{N-1} \sum_{j=i+1}^{N} d_{i,j}, \forall\, d_{i,j}$$

T being defined as spanning tree, and MST being the T with the minimum sum of its edges weighed, $$Mst = \text{Min}\{d(T)\}$$

the number of its possible tree being:

$$T = V^{V-2}$$

wherein:

$d_{i,j}$ is the Euclidean distance of each point i from each point j;

d(T) is the length of sum of the edges; and

V are the vertices expressable as the points in a map.

5. The method of claim 1, wherein the n-dimensional space of a map is quantized in pixels or voxels, and a certain minimum pixel or voxel distance is defined.

6. An algorithm actuating the method according to claim 1, wherein the algorithm is expressed in a program code and saved on a hard disk or on a non-transitory portable readable medium and chargeable in a memory of a computing machine and executed by the computing machine.

* * * * *